(12) United States Patent     (10) Patent No.: US 12,630,422 B2

Kil et al.     (45) Date of Patent: May 19, 2026

(54) METHOD AND APPARATUS FOR PURIFYING ULTRA-HIGH PURITY HYDROGEN FLUORIDE

(71) Applicant: RAM TECHNOLOGY CO., LTD., Yongin-si (KR)

(72) Inventors: June-Ing Kil, Seoul (KR); Young-Su Jang, Hwaseong-si (KR); Hwan-Pyoung Lee, Daejeon (KR)

(73) Assignee: RAM TECHNOLOGY CO., LTD., Yongin-si (KR)

( * ) Notice: Subject to any disclaimer, the term of this patent is extended or adjusted under 35 U.S.C. 154(b) by 244 days.

(21) Appl. No.: 18/561,983

(22) PCT Filed: Jan. 27, 2022

(86) PCT No.: PCT/KR2022/001423

§ 371 (c)(1),
(2) Date: Nov. 17, 2023

(87) PCT Pub. No.: WO2022/255586

PCT Pub. Date: Dec. 8, 2022

(65) Prior Publication Data

US 2024/0239656 A1     Jul. 18, 2024

(30) Foreign Application Priority Data

Jun. 3, 2021    (KR) ........................ 10-2021-0072104

(51) Int. Cl.
    B01D 3/14       (2006.01)
    B01D 3/34       (2006.01)
    (Continued)

(52) U.S. Cl.
CPC .............. C01B 7/196 (2013.01); B01D 3/143 (2013.01); B01D 3/346 (2013.01); B01D 3/42 (2013.01)

(58) Field of Classification Search
CPC .. B01S 3/143; B01S 3/346; B01S 3/42; C01B 7/196
See application file for complete search history.

(56) References Cited

U.S. PATENT DOCUMENTS 3,004,829 A * 10/1961 Boyle ..................... C01B 7/196
                                              423/485
4,668,497 A * 5/1987 Miki ....................... C01B 7/196
                                              210/753

(Continued)

FOREIGN PATENT DOCUMENTS

JP         61-151002 A     7/1986
JP         06-144805 A     5/1994
(Continued)

OTHER PUBLICATIONS

ESPACENET Machine Translation of WO200592786 Obtained Sep. 15, 2025. (Year: 2025).*

(Continued)

*Primary Examiner* — Jonathan Miller

(74) *Attorney, Agent, or Firm* — Sughrue Mion, PLLC

(57) ABSTRACT

The present invention discloses a method and apparatus for purifying ultra-high purity hydrogen fluoride, which purify it through a continuous distillation process by putting crude hydrogen fluoride instead of hydrogen fluoride into a multi-stage distillation column as it is, and remove impurities in hydrogen fluoride through a contact with fluorine gas having (Continued)

the concentration of the $F_2$ gas automatically controlled depending on the content of arsenic fluoride that is an impurity.

7 Claims, 4 Drawing Sheets

(51) Int. Cl.
    *B01D 3/42*         (2006.01)
    *C01B 7/19*         (2006.01)

(56)       References Cited

U.S. PATENT DOCUMENTS

| | | | | |
|---|---|---|---|---|
| 4,756,899 | A * | 7/1988 | Jenczewski | C01B 7/195 423/483 |
| 4,929,435 | A * | 5/1990 | Boghean | C01B 7/196 203/31 |
| 5,100,639 | A * | 3/1992 | Freire | C01B 7/195 205/687 |
| 5,411,726 | A * | 5/1995 | Bulan | C01B 11/24 423/489 |
| 6,346,227 | B1 * | 2/2002 | Lailach | B01J 19/02 423/483 |
| 9,061,958 | B2 * | 6/2015 | Wismer | B01D 3/36 |
| 2004/0022720 | A1 * | 2/2004 | Low | C01B 7/0737 423/240 R |
| 2014/0231240 | A1 * | 8/2014 | Wismer | C07C 17/383 203/41 |

FOREIGN PATENT DOCUMENTS

| | | | | |
|---|---|---|---|---|
| JP | 2005-281048 | A | 10/2005 | |
| KR | 10-2007-0081886 | A | 8/2007 | |
| KR | 10-2013-0141402 | A | 12/2013 | |
| KR | 10-2014-0001262 | A | 1/2014 | |
| KR | 10-2310763 | B1 | 10/2021 | |
| WO | WO-2005092786 | A1 * | 10/2005 | C01B 7/196 |

OTHER PUBLICATIONS

Korean Office Action for KR 10-2021-0072104 dated Jul. 22, 2021.
International Search Report for PCT/KR2022/001423 dated May 9, 2022.

* cited by examiner

METHOD AND APPARATUS FOR PURIFYING ULTRA-HIGH PURITY HYDROGEN FLUORIDE

CROSS REFERENCE TO RELATED APPLICATIONS

This application is a National Stage of International Application No. PCT/KR2022/001423 filed Jan. 27, 2022, claiming priority based on Korean Patent Application No. 10-2021-0072104 filed Jun. 3, 2021, the entire disclosures of which are incorporated herein by reference.

TECHNICAL FIELD

The present invention discloses a purification method and apparatus capable of producing ultra-high purity hydrogen fluoride.

BACKGROUND ART

Hydrogen fluoride (HF) has been used in various industrial fields. Hydrogen fluoride is most commonly produced among fluorine compounds and is supplied in a hydrogen fluoride state in an anhydrous form and a hydrofluoric acid state in an aqueous solution (hydrous) form containing ultrapure water.

Hydrofluoric acid is produced through various purification processes such as a distillation method, an electrolysis method, an adsorption method, and a membrane separation method using hydrogen fluoride raw materials (Patent Documents 1 to 3), and among these, the distillation method using a fractional distillation process is widely being used.

Hydrogen fluoride is produced through the process of adding sulfuric acid to fluorite (CaF$_2$) and simultaneously heating it. Crude hydrogen fluoride produced through the above reaction contains various impurities such as SO$_2$ and trace amounts of AsF$_3$, BF$_3$, PFs, SiF$_4$, FeF$_3$, and SF$_6$ in addition to hydrogen fluoride. The impurities are removed through various purification processes including a pretreatment process so that it is possible to produce industrial hydrofluoric acid using hydrogen fluoride usually having a purity of 99.9%.

Low-purity hydrofluoric acid, such as industrial hydrofluoric acid, has been used for industrial uses, and ultra-high purity hydrofluoric acid is needed for etching and cleaning uses of semiconductors and displays.

In the case of ultra-high purity hydrofluoric acid used for etching and cleaning uses, hydrofluoric acid in which anhydrous hydrofluoric acid is diluted in ultrapure water at a certain ratio is used, and if impurities are present in such hydrofluoric acid used for the semiconductor manufacturing process, they remain on the wafer during etching and cleaning, causing pattern formation defects to occur, thereby reducing the semiconductor production yield. Accordingly, in order to lower the defect rate, ultra-high purity hydrogen fluoride, ultra-high purity hydrogen fluoride among them with a metal impurity concentration controlled to several ppt, has been used. However, as the purity of hydrogen fluoride increases, purification costs increase, caution is required against contamination during storage and handling, and there are disadvantages such as low production efficiency and low product conversion rate to high-purity hydrogen fluoride.

Most of the impurities contained in hydrogen fluoride can be removed through distillation purification, but impurities such as arsenic (As) among the impurities exist as arsenic trifluoride (AsF$_3$) in anhydrous hydrofluoric acid, and such impurities have a boiling point of 57.13° C., making it not to be very different from that of hydrofluoric acid (HF) of 19.5° C., and as it forms an azeotropic point, separation through distillation purification is not easy.

Since arsenic fluoride not only adversely affects the characteristics of semiconductor devices, but also causes equipment corrosion and problems in environmental aspects, it is desirable to surely remove it during the ultra-high purity hydrogen fluoride production process.

A method of producing high purity hydrogen fluoride by mixing an aqueous solution of an oxidizing agent such as hydrogen peroxide or potassium permanganate with hydrogen fluoride and thus removing arsenic fluoride in hydrogen fluoride has been proposed from old times. However, in such a method, a portion of hydrogen fluoride is dissolved in water of the oxidizing agent aqueous solution used, resulting in loss of production amount and generation of a large amount of reaction by-products, and the corrosiveness increases rapidly in hydrogen fluoride containing water compared to hydrogen fluoride, making the preventive maintenance (PM) cycle of production facilities faster to cause both process problems such as a decrease in the productivity of the process and stability problems caused by hydrogen fluoride together.

Moreover, a pretreatment process to remove impurities such as arsenic is performed before the production process of hydrofluoric acid from hydrogen fluoride, and results in the addition of an apparatus and an increase in process costs according to the pretreatment process. In addition, the remaining impurities in hydrogen fluoride are not easily removed during the purification process even if pretreatment is performed, it is difficult to produce hydrogen fluoride of high purity, especially ultra-high purity.

(Patent Document 1) Korean Patent Publication No. 10-2006-0014138
(Patent Document 2) Korean Patent Publication No. 10-2013-0141402
(Patent Document 3) Japanese Patent Publication No. 1994-144805

DISCLOSURE

Technical Problem

In the existing technology, research related to the production of ultra-high purity hydrogen fluoride was continued in order to solve a problem that hydrogen fluoride is produced from fluorite (CaF$_2$), but production costs can increase significantly due to the generation of a large amount of environmental waste.

The process for producing ultra-high purity hydrogen fluoride is carried out in the order of the pretreatment process and purification process of crude hydrogen fluoride, but in the present invention, a method capable of producing ultra-high purity hydrogen fluoride by performing a purification process using crude hydrogen fluoride as a raw material excluding the pretreatment process is proposed. In addition, the present invention is a result of conducting multifaceted research to produce ultra-high purity hydrogen fluoride even without a pretreatment process.

As a result, a gas stream that can oxidize and remove impurities is put into crude hydrogen fluoride inside a multi-stage distillation column which coexists in the gas phase and liquid phase, and an advanced process control (APC) module is applied as an input process processor so that ultra-high purity hydrogen fluoride could be continuously produced at a high mass production conversion rate by immediately applying it to the purification process depending on the quality of crude hydrogen fluoride that is a raw material.

Therefore, an object of the present invention is to provide a purification method and apparatus capable of producing ultra-high purity hydrogen fluoride using crude hydrogen fluoride as a raw material.

Technical Solution

In order to achieve the above object, the present invention provides a method for purifying ultra-high purity hydrogen fluoride, the method including steps of:

providing crude hydrogen fluoride from a raw material supply unit;

performing a continuous distillation process of supplying crude hydrogen fluoride to a multi-stage distillation column to extract and remove impurities in the distillation column after fractional distillation, and transfer distilled hydrogen fluoride to a next multi-stage distillation column; and injecting a gas stream containing an $F_2$ gas and an inert gas for removal of $AsF_3$ in impurities into the multi-stage distillation column into which crude hydrogen fluoride is put, wherein the gas stream is a gas stream whose concentration is adjusted according to the content of $AsF_3$ contained in hydrogen fluoride that passed through the multi-stage distillation column.

Additionally, the gas stream containing the $F_2$ gas and the inert gas is injected also into another multi-stage distillation column into which crude hydrogen fluoride is not put.

Furthermore, the present invention provides an apparatus for purifying ultra-high purity hydrogen fluoride, the apparatus including:

a raw material supply unit for supplying a crude hydrogen fluoride raw material;

a distillation purification unit equipped with a plurality of multi-stage distillation columns for performing a continuous distillation process;

a gas supply unit for supplying a gas stream containing an $F_2$ gas and an inert gas into the multi-stage distillation columns;

a recovery unit for recovering ultra-high purity hydrogen fluoride; and an advanced process control unit for process control to enable continuous process, wherein a gas stream whose concentration is adjusted according to the content of $AsF_3$ contained in hydrogen fluoride that has passed through the multi-stage distillation columns by the advanced process control unit is supplied to the multi-stage distillation columns into which crude hydrogen fluoride is put.

Advantageous Effects

The ultra-high purity hydrogen fluoride purification process according to the present invention is performed through continuous supply, and since the flow of hydrogen fluoride needs to be stopped when inspection or preventive maintenance (PM) of production facilities is required, the process can be continuously repeatedly performed until it is stopped.

Further, the process is simplified and the pretreatment cost is reduced at the same time by using crude hydrogen fluoride without pretreatment of hydrogen fluoride used as a raw material. In particular, impurities can be minimized by introducing the gas stream into the first multi-stage distillation column into which crude hydrogen fluoride is introduced.

Further, even if the composition or content of impurities in crude hydrogen fluoride is not constant, it is possible to produce ultra-high purity hydrogen fluoride of uniform quality at high efficiency.

Such a method simplifies the purification process, enabling economical and efficient production of ultra-high purity hydrogen fluoride.

BEST MODE

Figure 1:
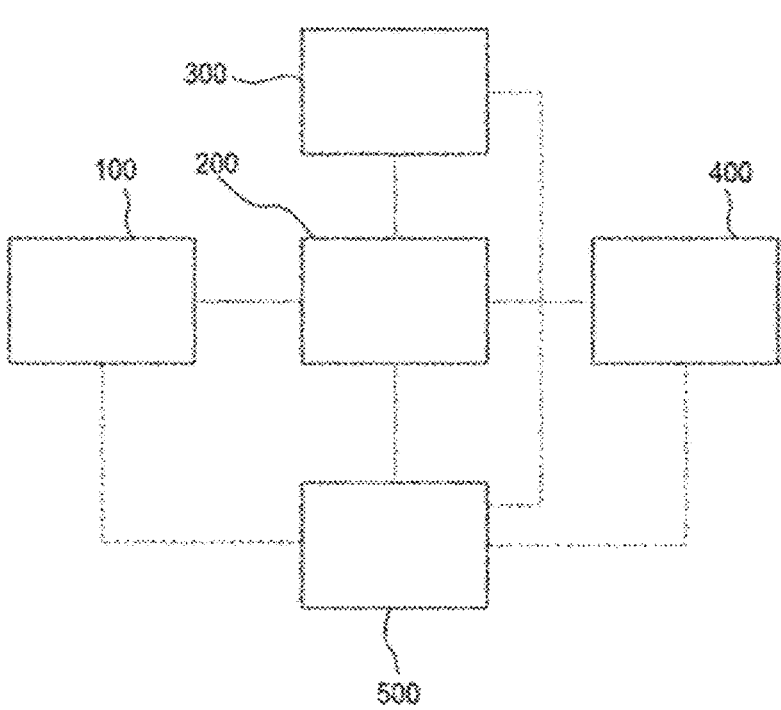
FIG. 1 is a schematic diagram used for purifying ultra-high purity hydrogen fluoride according to the present invention.

The present invention relates to a method for purifying ultra-high purity hydrogen fluoride, the method including steps of:

providing crude hydrogen fluoride from a raw material supply unit;

performing a continuous distillation process of supplying crude hydrogen fluoride to a multi-stage distillation column to extract and remove impurities in the distillation column after fractional distillation, and transfer distilled hydrogen fluoride to a next multi-stage distillation column; and injecting a gas stream containing an $F_2$ gas and an inert gas for removal of $AsF_3$ in impurities into the multi-stage distillation column into which crude hydrogen fluoride is put, wherein the gas stream is a gas stream whose concentration is adjusted according to the content of $AsF_3$ contained in hydrogen fluoride that passed through the multi-stage distillation column.

Furthermore, the present invention relates to an apparatus for purifying ultra-high purity hydrogen fluoride, the apparatus including:

a raw material supply unit for supplying a crude hydrogen fluoride raw material;

a distillation purification unit equipped with a plurality of multi-stage distillation columns for performing a continuous distillation process;

a gas supply unit for supplying a gas stream containing an $F_2$ gas and an inert gas into the multi-stage distillation columns;

a recovery unit for recovering ultra-high purity hydrogen fluoride; and an advanced process control unit for process control to enable continuous process, wherein a gas stream whose concentration is adjusted according to the content of $AsF_3$ contained in hydrogen fluoride that has passed through the multi-stage distillation columns by the advanced process control unit is supplied to the multi-stage distillation columns into which crude hydrogen fluoride is put.

MODE FOR INVENTION

In the present specification, the term "ultra-high purity hydrogen fluoride" is recognized in the art as one referring to a gas with a purity of 99.99999% (6N) or higher. Ultra-high purity hydrogen fluoride removes specific impurities to one part per billion (ppb, $10^9$) or less, preferably a level of one part per trillion (ppt, $10^{12}$) or one part per quadrillion (ppq, $10^{15}$).

'Impurities in ultra-high purity hydrogen fluoride' referred to in the present invention refers to all compositions other than HF, and major impurities include $SO_2$, $AsF_3$, $BF_3$, $SiF_4$, $FeF_3$, $SF_6$, and PFs.

At this time, since impurities except for $AsF_3$ in hydrogen fluoride can be easily removed through multi-stage distillation, the impurity to be decreased through the corresponding invention may substantially be $AsF_3$.

That is, in the removal of impurities using the gas stream of the present invention, the substantial impurity can be regarded as $AsF_3$. At this time, $AsF_3$ is trivalent arsenic fluoride, and $AsF_5$, which is its oxidized form, is pentavalent arsenic fluoride.

The present invention presents a purification method and purification apparatus which enable a purification process continuously for 24 hours by putting crude hydrogen fluoride as a raw material, and can produce ultra-high purity hydrogen fluoride with impurities removed to ppt or less, preferably ppq level, through automatic control.

Hereinafter, embodiments of the present invention will be described in detail with reference to the drawings. In the description of the embodiments, the same reference numerals are assigned to the same components, and in some cases, descriptions of the same reference numerals are omitted.

FIG. 1 is a schematic diagram used for purifying ultra-high purity hydrogen fluoride according to the present invention.

Referring to FIG. 1, the ultra-high purity hydrogen fluoride purification includes a raw material supply unit 100 for supplying a crude hydrogen fluoride raw material, a distillation purification unit 200 equipped with a plurality of multi-stage distillation columns for performing a continuous distillation process, a gas supply unit 300 for supplying a gas stream into the multi-stage distillation columns; a recovery unit 400 for recovering ultra-high purity hydrogen fluoride, and an advanced process control unit 500 for process control to enable continuous process.

The raw material supply unit 100 is a device for supplying crude hydrogen fluoride, which is a raw material for ultra-high purity hydrogen fluoride, and is provided with a storage tank containing crude hydrogen fluoride produced by the reaction of fluorite and sulfuric acid.

Conventionally, hydrogen fluoride as a raw material for hydrogen fluoride purification uses raw materials from which impurities have been removed to the ppm level through pretreatment, but in the present invention, crude hydrogen fluoride is used as the raw material put into the raw material supply unit 100 for hydrogen fluoride purification. Crude hydrogen fluoride contains crude hydrogen fluoride obtained by the reaction of fluorite and sulfuric acid and an excessive amount of impurities (% level), and is a raw material that has not been subjected to separate pretreatment. The cost of supplying raw materials can be greatly lowered compared to conventional hydrogen fluoride through the use of such crude hydrogen fluoride, and the process can be simplified and the production cost can be lowered by excluding the pretreatment process.

Crude hydrogen fluoride of the raw material supply unit 100 may be supplied directly to the next distillation purification unit 200 in a liquid state, or may be supplied after being vaporized in a gaseous state. At this time, supply in gaseous state only changes the properties, and the term for a separate pretreatment process is not included.

The distillation purification unit 200 is a device for removing impurities in crude hydrogen fluoride and obtaining ultra-high purity hydrogen fluoride through a fractional distillation process.

The fractional distillation process enables a batch distillation process and a continuous distillation process. It is performed by continuous distillation processes among them, and performed by a continuous distillation process of passing through a continuous multi-stage distillation column that has two or more distillation stages and enables continuous distillation among the continuous distillation processes.

The continuous distillation process includes a multi-stage distillation column that vaporizes crude hydrogen fluoride to perform concentration purification, and a reboiler that heats crude hydrogen fluoride to generate hydrogen fluoride vapor.

The multi-stage distillation column has 2 to 50 theoretical stages, for example, 3 to 40 theoretical stages. When heated by the reboiler, hydrogen fluoride in a gaseous state and impurities together with crude hydrogen fluoride in a liquid state coexist in the multi-stage distillation column, and the composition of the gaseous state is separated into a column top region, a middle region, and a column bottom region of the multi-stage distillation column. Impurities having a low boiling point are transferred to the column top region and discharged, and impurities having a high boiling point are transferred to the column bottom region and discharged. Hydrogen fluoride is located in the middle region and is continuously transferred to a next multi-stage distillation column.

In the distillation purification unit 200, 2 or more, 3 to 40, or 4 to 25 multi-stage distillation columns are connected, and it is possible to produce ultra-high purity hydrogen fluoride through continuous passage through the multi-stage distillation columns. The multi-stage distillation columns are connected to each other by piping, and they may be arranged in a state of series, parallel, or a mixture thereof, and preferably may be connected in a state of series.

The gas supply unit 300 is a device for supplying a gas stream to remove impurities, particularly $AsF_3$, in crude hydrogen fluoride. The gas stream contains an $F_2$ gas and an inert gas to transfer and dilute it.

The $F_2$ gas (fluorinated gas) is a very expensive gas produced by electrolysis of hydrogen fluoride, and the cost of ultra-high purity hydrogen fluoride varies depending on how effectively it is used when the $F_2$ gas is used.

A method of purifying hydrogen fluoride after mixing an $F_2$ gas with hydrogen fluoride for 5 minutes or more has conventionally been presented in JP2005-281048, but this method is limited to the batch method and is not suitable for purifying hydrogen fluoride through a continuous process, and even if applied, it is apprehended that the $F_2$ gas is excessively used.

The present invention applies the $F_2$ gas to a continuous process by applying the APC module of the advanced process control unit 500, which will be described below, and designed as the most effective input method. The $F_2$ gas is used by mixing with an inert gas, and the method is performed in a manner of determining the input amount of the $F_2$ gas depending on the concentration of $AsF_3$ in crude hydrogen fluoride to be purified.

The $F_2$ gas supplied from the gas supply unit 300 undergoes an oxidation reaction with $AsF_3$ having a high boiling point in crude hydrogen fluoride and is converted into $AsF_5$ having a low boiling point and is removed from the column top part in the form of gas. In addition to such a reaction, the $F_2$ gas can be additionally easily removed from the column bottom part by being converted into $HAsF_6$ having a high boiling point through an ion reaction with HF present together with $AsF_5$.

Most of the impurities contained in crude hydrogen fluoride are divided into low and high boiling points compared to hydrogen fluoride, and because of this, most of them are removed during the distillation process in a multistage distillation column, but in the case of trivalent arsenic fluoride ($AsF_3$), removal thereof is very difficult. In other words, $AsF_3$ (bp=62.8° C.) or the like, which is contained in a very small amount in high-purity hydrogen fluoride, has a high boiling point itself, but forms a complex with hydrogen fluoride and lowers the boiling point to make it similar to hydrogen fluoride, or forms an azeotropic point therewith to make separation very difficult.

When the $F_2$ gas is injected in order to remove trivalent arsenic fluoride, which is the most problematic among the impurities contained in hydrogen fluoride, an oxidation reaction occurs as shown in Reaction Formula below.

$$AsF_3 + F_2 \rightarrow AsF_5 \qquad \text{[Reaction Formula 1]}$$

$$AsF_5 + HF \rightarrow HAsF_6 \qquad \text{[Reaction Formula 2]}$$

Through the oxidation reaction, $AsF_3$, a trivalent arsenic fluoride, reacts with an $F_2$ gas and is converted to $AsF_5$, a pentavalent arsenic fluoride. This pentavalent arsenic fluoride has a bp of −52.8° C., which is different from the bp (19.5° C.) of hydrogen fluoride in boiling point, so that it can be separated in the distillation process, and it also reacts with HF to form a high boiling point complex, making separation easier.

In substance, the content of $AsF_3$ in crude hydrogen fluoride put into the first multi-stage distillation column is at the ppm level, and when a pure 100% $F_2$ gas is used, the difference in boiling point from hydrogen fluoride is significant, making it difficult to provide sufficient reaction conditions, the process costs are greatly increased due to this. Accordingly, in the present invention, a mixed gas in which the $F_2$ gas is diluted with an inert gas is used in order to obtain low cost and high efficiency.

When crude hydrogen fluoride in a liquid or gaseous state is put into the first multi-stage distillation column, it is converted to a gaseous state by a reboiler. At this time, an oxidation reaction occurs due to contact between crude hydrogen fluoride in the gaseous state and the $F_2$ gas, that is, gas-gas contact. Additionally, an oxidation reaction occurs due to contact between crude hydrogen fluoride in the liquid state and the $F_2$ gas, that is, liquid-gas contact. These two reactions can occur simultaneously to maximize the oxidation reaction shown in Reaction Formula 1 above.

The $F_2$ gas may be put into the multi-stage distillation column into which crude hydrogen fluoride is put, or additionally into all remaining multi-stage distillation columns. Since there is a difference in the content of arsenic fluoride in each multi-stage distillation column, the $F_2$ gas is put into the multi-stage distillation column in a state that it is diluted to a predetermined concentration corresponding to the content of the remaining arsenic fluoride in order to ensure the best effect with a small amount.

The inert gas in the gas stream of the present invention is any one or more gases of He, $N_2$, and Ar, preferably $N_2$.

The concentration of the $F_2$ gas: inert gas in the gas stream may be adjusted to vary within the range of 10:90 to 90:10% by weight. As the content of the $F_2$ gas increases, the possibility of participating in the oxidation reaction of $AsF_3$ to $AsF_5$ increases, but there is a limit to the contact between $AsF_3$ and the $F_2$ gas when considering the residence time of crude hydrogen fluoride in the multi-stage distillation column. Therefore, it is desirable to adjust the $F_2$ gas according to the impurity concentration of crude hydrogen fluoride when considering the cost aspect.

The $F_2$ gas and the inert gas of the gas stream may be simultaneously put into the multi-stage distillation column, or may be mixed prior to that and put in the form of a mixed gas.

As one embodiment, if the content of $AsF_3$ in hydrogen fluoride that has passed through the first multi-stage distillation column is 100 ppm or more, the concentration of the $F_2$ gas put is allowed to become 0.1 to 0.2%, and if the content of $AsF_3$ in hydrogen fluoride is 10 to 100 ppb, the concentration of the $F_2$ gas put is made to become 0.005 to 0.01%.

The recovery unit 400 is a device for recovering ultrahigh purity hydrogen fluoride purified by passing through the distillation purification unit 200. Ultra-high purity hydrogen fluoride may be recovered in a gaseous state after passing through the final multi-stage distillation column, or in a liquefied liquid state through a condenser.

Purification of ultra-high purity hydrogen fluoride from crude hydrogen fluoride through the raw material supply unit 100, distillation purification unit 200, gas supply unit 300, and recovery unit 400 is automatically controlled in the advanced process control unit 500 for process control to enable a continuous process.

The advanced process control unit 500 is a device that includes an advanced process control (hereinafter referred to as 'APC') module.

The APC module refers to a multivariate predictive control technology that consists of a mathematical model simultaneously considering the dynamic characteristic relationship between many process operation variables and thus controls to maintain stable and economical optimal operating conditions. The APC module is a technology that improves the efficiency of the entire factory and convenience of operation by using software rather than reinforcing factory facilities.

As the purification process of ultra-high purity hydrogen fluoride from crude hydrogen fluoride is controlled with the APC module, product yield is improved and product upgrade is achieved, and operating costs and giveway are reduced. In addition, even if the qualities of crude hydrogen fluorides used as a raw material are different from each other, the quality of finally obtained ultra-high purity hydrogen fluoride can be uniformized and the flexibility in operation can be improved. In addition, it is possible to generate benefits such as reduced energy usage while increasing production and throughput by increasing the efficiency of the process.

Due to the nature of the process, chemical processes should not consider only one target variable when moving one control variable, but should consider several situations simultaneously. To this end, the correlation between the control variables required for operation and the target variable should be known. A dynamic characteristic model expressing this correlation is a multi-variable predictive control technology using a computer that is contained inside the APC module and controls the process so as to maintain it more stably and economically. The multi-variable predictive control technology is a technology that simultaneously controls control variables so that each target value of the control variables can be satisfied by simultaneously considering the effects of several control variables on other control variables. It becomes possible to construct a dynamic model expressing the relationship between the manipulated variables (input variables, control variables, and disturbance variables) of the process and the control variables (output variables) using actual operation data, and predict and control future movements of the manipulated variables and control variables using this dynamic model.

In constructing the purification method and apparatus of the present invention, the largest variable in process control through the APC module can be said to be the concentration of impurities.

The raw material supply unit 100 receives an opening/closing signal from the advanced process control unit 500 and supplies crude hydrogen fluoride to a multi-stage distillation column in an opened state of the distillation purification unit 200. Hydrogen fluoride purified by the multi-stage distillation column is continuously transferred to a next multi-stage distillation column by passing through a transfer line. A gas stream is supplied from the gas supply unit 300 to the multi-stage distillation column to remove impurities.

In this process, whether or not the gas stream is treated, the concentration of the gas stream treated, the injection amount of the gas stream, etc. vary depending on crude hydrogen fluoride present in the multi-stage distillation column and the content of impurities in hydrogen fluoride. The content of the impurities may be obtained by measuring the concentration of impurities present in the multi-stage distillation column.

For concentration analysis, a sensor for concentration measurement is mounted on each of them, which is displayed on a display connected to the advanced process control unit 500 via the analysis device.

The concentration analysis method is divided according to the type of impurity and measured using one or more analysis instruments, and is not particularly limited in the present invention.

Metallic impurities are analyzed using special equipment that is free from impurity contamination and can be pretreated to a uniform concentration by taking into consideration the equipment damage of the inductively coupled plasma mass spectrometer, and moisture and ionic impurities are analyzed through FT-IR, and impurities in a gaseous form are precisely analyzed through gas chromatography (GC).

A gas stream suitable for the concentration of the impurities is designed, the measured concentration of the impurities are sent to the APC module, and the composition of the gas stream when putting the first gas stream, the second gas stream, and the nth gas stream, injection amount during treatment, etc. are changed depending on the set value of the impurity concentration. Through such a change method, even if the qualities of crude hydrogen fluorides used as a raw material are different, finally obtained hydrogen fluoride can be obtained as an ultra-high purity material of uniform quality.

In particular, the purification method and purification apparatus according to the present invention are capable of performing a continuous process, and enable a 24 hour operation by automatic control by controlling the process with the APC module, thereby having an advantage in that the production and throughput of ultra-high purity hydrogen fluoride can be improved at low cost.

The production process of ultra-high purity hydrogen fluoride according to the present invention will be described in detail with reference to the drawings by using the configuration described above.

The respective devices are not shown, but may additionally include a flow regulator, a pressure controller, a compressor, a cooler, a condenser, a storage tank, a supply amount control valve, a gas-liquid separator, a flow meter, an analysis device, an analysis sample collection device, a leak preventer, a liquid or gas transfer pump, an exhaust device, an overpressure prevention device, an automation device, various sensors, thermometers, mass meters, pressure gauges, and volumetric instruments.

Figure 2:
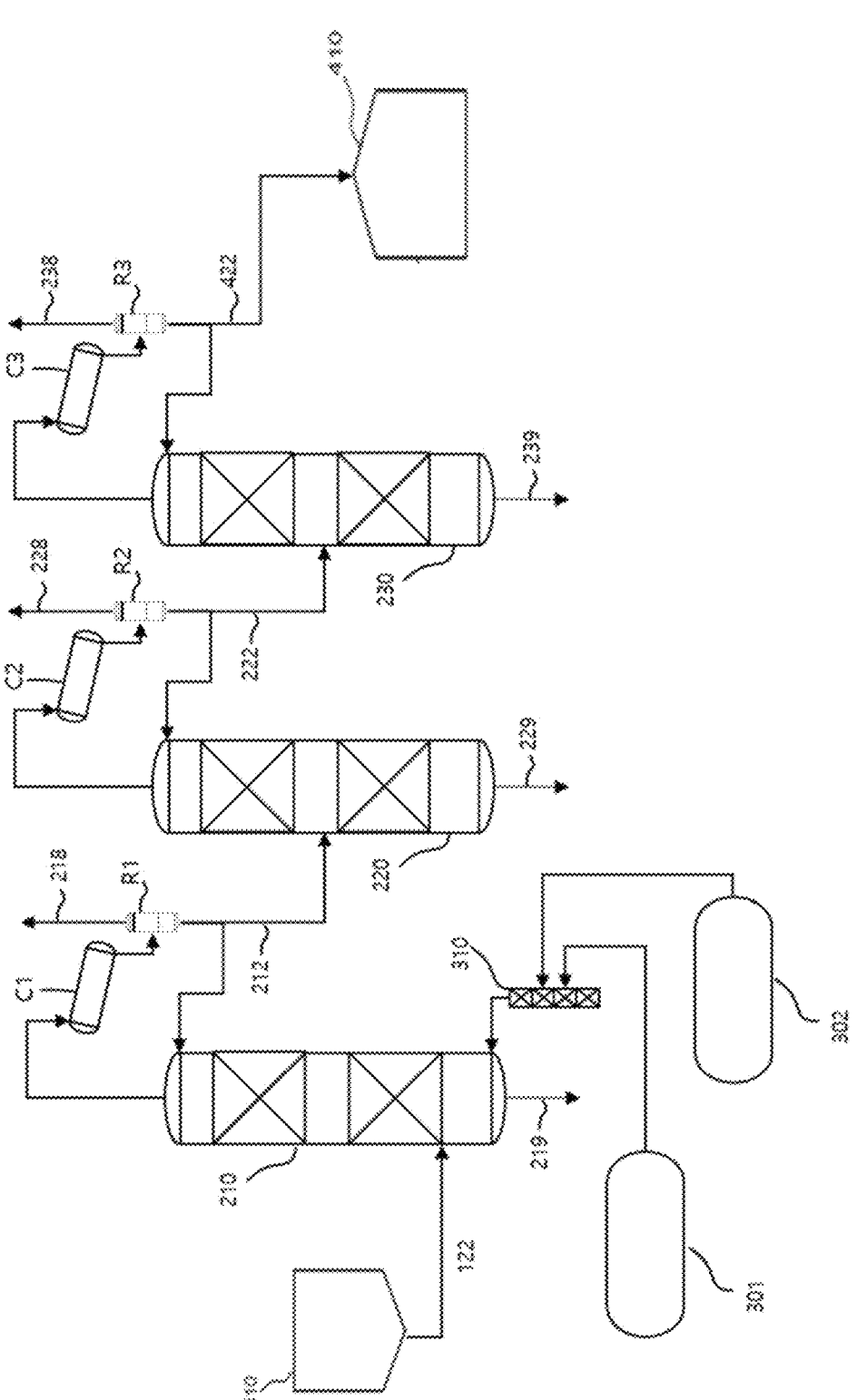
FIG. 2 is a schematic diagram showing an apparatus for purifying hydrogen fluoride according to one embodiment of the present invention.

FIG. 2 is a schematic diagram showing an apparatus for producing ultra-high purity hydrogen fluoride according to one embodiment of the present invention. At this time, three multi-stage distillation columns are shown, but this is only an example for explanation, and the number and arrangement method of the multi-stage distillation columns for application to the actual process can be varied in various ways.

Hereinafter, the process is described.

Crude hydrogen fluoride, which is a raw material, is transferred from a crude hydrogen fluoride storage tank 110 to the bottom part of a first distillation column 210 through a transfer line 122 by pumping with a transfer pump (not shown) or pressurizing inert gas.

Crude hydrogen fluoride in the crude hydrogen fluoride storage tank 110 may be put into the first distillation column 210 in a liquid state, or may be put into the first distillation column 210 in a gaseous state through an evaporator 600. Introduction of the gaseous state of crude hydrogen fluoride using the evaporator 600 has the effect of removing impurities as high concentration impurities remain in the lower part of the evaporator 600.

Crude hydrogen fluoride put into the first distillation column 210 is subjected to fractional distillation so that low-boiling and high-boiling impurities are discharged along discharge lines 218 and 219 in the column top and column bottom regions, respectively. The gas discharged from the first distillation column 210 passes through a cooler C1 and a reflux drum R1, and then hydrogen fluoride from which impurities are primarily removed is transferred to a second distillation column 220 along a transfer line 212. At this time, impurities supplied from the first distillation column 210 may pass through the cooler C1 and the reflux drum R1 and then be discharged through a discharge line 218 at the top of the column.

Through fractional distillation in the first distillation column 210, most impurities such as $SO_2$, $AsF_3$, $BF_3$, $PFs$, $SiF_4$, $FeF_3$, and $SF_6$ in crude hydrogen fluoride are removed.

In order to remove $AsF_3$ among them, which is difficult to separate, an oxidation reaction is performed by injecting a mixed gas of $F_2$ gas/inert gas, that is, a gas stream, from a gas stream storage tank 310.

In injection of the gas stream, both a downward injection method of performing injection from the top to the bottom and an upward injection method of performing injection from the bottom to the top may be used. Such a method may vary depending on the facility process, and may be carried out in a way that increases the opportunity for contact between crude hydrogen fluoride and the $F_2$ gas. In FIG. 2, the downward injection method is shown for convenience.

The input of the $F_2$ gas/inert gas into the gas stream may be made through measurement of the removal concentration of $AsF_3$ contained in crude hydrogen fluoride in the first distillation column by the APC module.

That is, the concentration of $AsF_3$ contained in hydrogen fluoride that has passed through the first distillation column 210 is measured and the concentration of the $F_2$ gas put into the first distillation column is controlled in a direction of minimizing the measured concentration of $AsF_3$.

Figure 3:
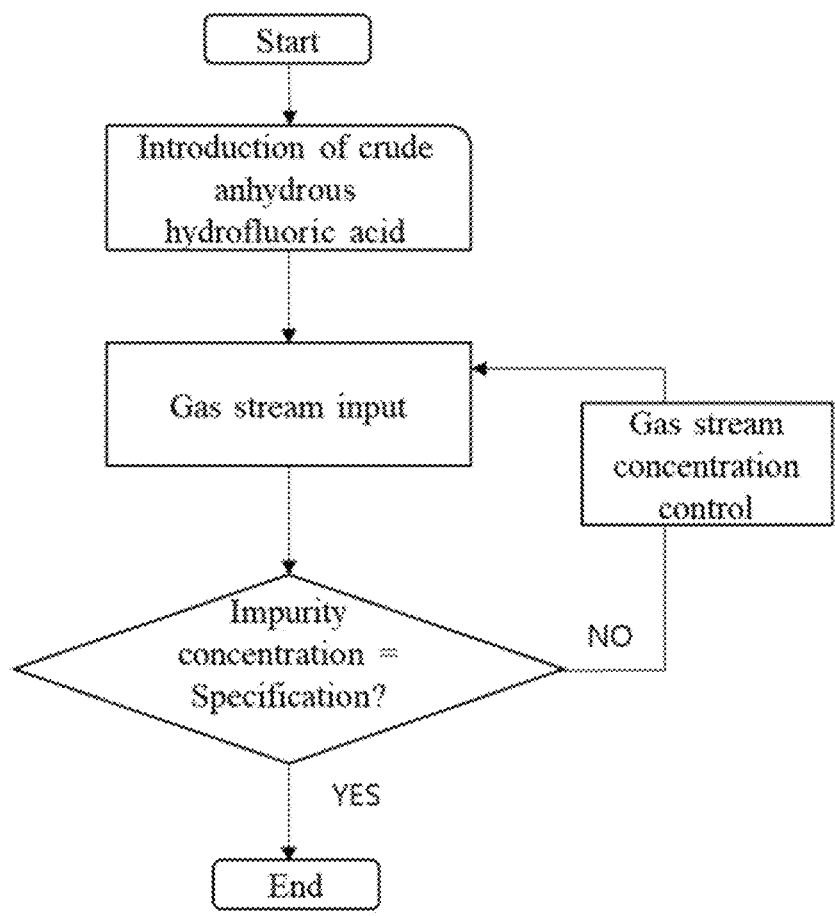
FIG. 3 shows a sequence of control of $F_2$ gas concentration by the APC module.

FIG. 3 shows a sequence of control of $F_2$ gas concentration by the APC module.

Referring to FIG. 3, crude hydrogen fluoride and an $F_2$ gas are put into the first distillation column 210.

In the setting of the APC module in this process, the operating variable becomes the concentration of the $F_2$ gas put into the first distillation column 210, and the control variables are set to the content of $AsF_3$ passing through the first distillation column 210, and a set of steady state values in which these two are optimized is calculated through simulation, etc.

Subsequently, the $AsF_3$ content in hydrogen fluoride that has passed through the first distillation column 210 is measured. The $AsF_3$ content may be measured at any one point of the outlet located at the connection region between the first distillation column 210 and the transfer line 212, or the transfer line 212. At this time, measurement can be made using an inductively coupled plasma mass spectrometer, etc. through preprocessing for analysis.

The measured $AsF_3$ content is replied to the APC module, and if it is the set value (YES) or less, the process continues.

If the measured value is higher than the set value (NO), the concentration of the $F_2$ gas input into the first distillation column 210 is adjusted by the APC module. According to the signal from the APC module, the flow rates of an $F_2$ gas storage tank 301 and an inert gas storage tank 302 connected to a gas stream mixing device 310 putting a gas stream into the first distillation column 210 are controlled by a flow rate controller (not shown), and the $F_2$ gas and the inert gas are put into the gas stream mixing device 310. At this time, a data table obtained through experiment or simulation, an algorithm for calculating the flow control value, etc. may be already stored in the APC module until the concentration value is received and input into the flow control value.

In this way, the distillation process in the first distillation column is performed by optimizing the manipulated variable so that it can be compatible with the set of normal values by the APC module by taking into account parameters including setpoints, hi/lo limits, and system disturbances of the control variables.

As a result, the APC module enables immediate and active quick response related to the concentration of the $F_2$ gas put with respect to the continuous concentration change of $AsF_3$ in hydrogen fluoride during the process.

The operating conditions of the first distillation column 210 are performed at a pressure of 0.1 to 3 bar and a temperature condition of 10 to 60° C., and an operation is performed for a residence time of 1 to 30 minutes. In the present invention, since crude hydrogen fluoride is directly put into the distillation column without pretreatment, it is performed under conditions in which the process conditions in the first distillation column 210 are different from those of other distillation columns.

As an oxidation reaction occurs between crude hydrogen fluoride and the $F_2$ gas through a gas-gas contact and a liquid-gas contact in the first distillation column 210 by the $F_2$ gas input, the effect of the $F_2$ gas input may be maximized. Such a technology has an advantage capable of maximizing the oxidation reaction since the gas-gas contact and the liquid-gas contact may occur simultaneously unlike the case that the oxidation reaction is performed only through the gas-gas contact when the $F_2$ gas is put in order to remove $AsF_3$ in hydrogen fluoride of a gaseous state.

Meanwhile, although not shown in FIG. 3, when using the upward injection method, the injection nozzle (not shown) is arranged so that the gas stream may be injected from the lower side to the upper side. The gas stream injected from the injection nozzle (not shown) has the advantage of having a high injection pressure as it increases from the lower part to the upper part. The $F_2$ gas in the gas stream injected from the injection nozzle (not shown) increases the chance of contact of crude hydrogen fluoride in a liquid state that falls by gravity from the upper part to the lower part with a trajectory in which it is injected from the lower part to the upper part so that the purification effect due to the $F_2$ gas input may be further increased.

Subsequently, hydrogen fluoride for which the primary distillation and oxidation processes have been completed is put into the second distillation column 220 in order to perform secondary distillation.

Hydrogen fluoride put into the second distillation column 220 is subjected to fractional distillation, and high-boiling point impurities are discharged along a discharge line 229 in the column bottom region. In addition, after purified hydrogen fluoride passes through a cooler C2 and a reflux drum R2, purified hydrogen fluoride is put into a third distillation column 230, and low-boiling point impurities may be discharged through a discharge line 228 at the top of the column. At this time, a portion of hydrogen fluoride is recovered to the second distillation column 220 and circulated therein.

Subsequently, in order to perform the third distillation, hydrogen fluoride for which the secondary distillation process has been completed is put into the central region of a third distillation column 230.

Hydrogen fluoride put into the third distillation column 230 is subjected to fractional distillation, and high-boiling point impurities are discharged along a discharge line 239 in the column bottom region. In addition, hydrogen fluoride and low-boiling point impurities pass through a cooler C3 and a reflux drum R3, and then hydrogen fluoride may be finally transferred to an ultra-high purity hydrogen fluoride storage tank 410 through a storage line 422, and low-boiling point impurities may be discharged through a discharge line 238 at the top of the column. At this time, a portion of hydrogen fluoride is recovered to the third distillation column 230 and circulated therein.

Hydrogen fluoride in an ultra-high purity state from which impurities in the third distillation column 230 have been removed is transferred to the ultra-high purity hydrogen fluoride storage tank 410 along the storage line 422 using gravity through a fall head.

The ultra-high purity hydrogen fluoride storage tank 410 is filled with ultra-high purity hydrogen fluoride containing a ppq level of impurities. At this time, ultra-high purity hydrogen fluoride is stored in a liquid state at a storage temperature of the boiling point or less.

In the $F_2$ gas injection as described above, the $F_2$ gas is injected not only in the first multi-stage distillation column into which crude hydrogen fluoride is put, but also in the remaining multi-stage distillation columns so that the purification effect of hydrogen fluoride may be further increased.

A method and apparatus for purifying ultra-high purity hydrogen fluoride according to another embodiment of the present invention are presented.

Figure 4:
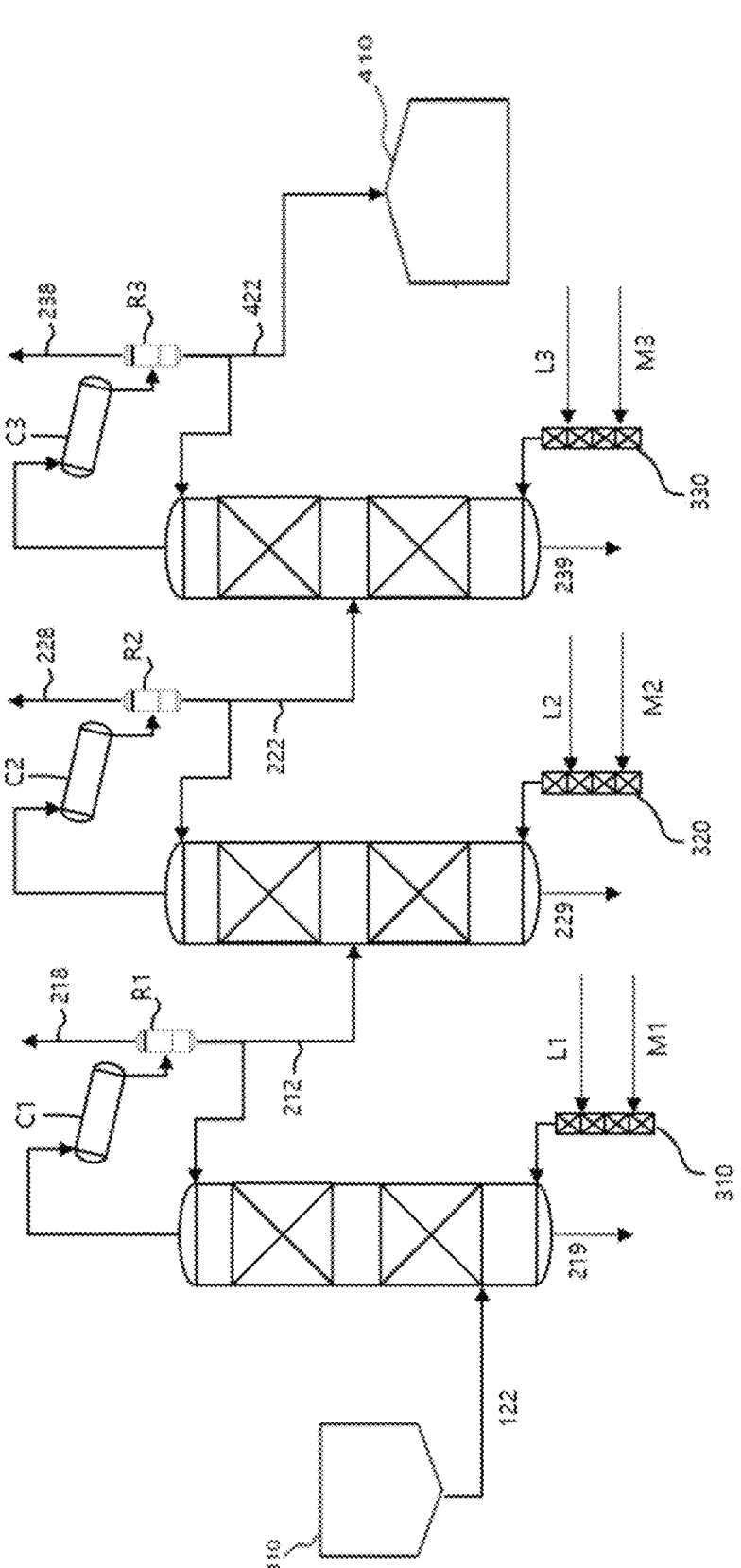
FIG. 4 is a schematic diagram showing an apparatus for purifying hydrogen fluoride according to another embodiment of the present invention.

FIG. 4 is a schematic diagram showing an apparatus for producing ultra-high purity hydrogen fluoride according to another embodiment of the present invention.

Referring to FIG. 4, additional gas stream mixing devices 310, 320, and 330 are connected to the first distillation column 210, the second distillation column 220, and the third distillation column 230, respectively. These are connected by pipes to an $F_2$ gas storage tank (not shown) and an inert gas storage tank (not shown), respectively, as shown in FIG. 2. Each of the $F_2$ gas/inert gas storage tanks is connected to the APC module along with each flow valve and flow controller for flow rate control. Although not shown separately, the supply of an $F_2$ gas and inert gases may be each independently made or connected to one storage tank, and these inert gases may be supplied through respective supply lines L1, L2, and L3, and the $F_2$ gas may be supplied through respective supply lines M1, M2, and M3.

In FIG. 4, hydrogen fluoride that has passed from the first distillation column 210 undergoes a distillation process bypassing through the second distillation column 220 through the transfer line 212, and is transferred to the third distillation column 230 through the transfer line 222 to perform a continuous distillation process.

At this time, the first distillation column 210 measures the content of $AsF_3$ in crude hydrogen fluoride supplied from the transfer line 212 so that, when the content of $AsF_3$ exceeds the set value by applying a signal to the APC module, the concentration of the $F_2$ gas in a first gas stream mixing device 310 is adjusted by adjusting flow valves of the $F_2$ gas supply line M1 and the inert gas supply line L1. The gas stream with the concentration adjusted in this way is put into the first distillation column 210 to perform a reaction process.

Such a process is equally performed even in the second distillation column 220 and the third distillation column 230.

When the $F_2$ gas is put into the first distillation column 210, the second distillation column 220, and the third distillation column 230, an oxidation reaction occurs due to a gas-gas contact reaction of the $F_2$ gas with hydrogen fluoride in a gaseous state. At this time, in order to increase the oxidation reaction, a vortex generator (not shown) capable of forming a vortex is installed inside the first distillation column 210, the second distillation column 220, and the third distillation column 230, or a gas stream injection method is varied so that it may be possible to maximize the oxidation reaction.

The ultra-high purity hydrogen fluoride purification process according to the present invention consists of continuous supply of raw materials and gas streams, and the process may be performed repeatedly until the flow of hydrogen fluoride needs to be stopped since it is necessary to stop the flow of hydrogen fluoride when inspection or PM of production facilities is required.

In addition, the process is simplified and the pretreatment cost is reduced at the same time by using crude hydrogen fluoride produced by the reaction of fluorite and sulfuric acid without pretreatment of hydrogen fluoride, which has conventionally been used as a raw material.

In addition, it is possible to produce ultra-high purity hydrogen fluoride with high efficiency even if the composition or content of impurities in the crude hydrogen fluoride is not constant. The moisture concentration of ultra-high purity hydrogen fluoride produced in this way is minimized, and thus there is an advantage in that the stability is very excellent.

As ultra-high purity hydrogen fluoride with a content of hydrogen fluoride impurities (especially arsenic fluoride) recovered according to the present invention having a ppq level, it can be desirably applied to fields requiring high purity hydrogen fluoride and hydrofluoric acid such as etching and cleaning uses of semiconductors and displays.

EXAMPLES

Hereinafter, Examples of the present invention will be described in detail, but the present invention is not limited thereto.

Example 1

As shown in FIG. 1, an apparatus in which three multi-stage distillation columns as a continuous multi-stage distillation column are connected in series was used.

Crude hydrogen fluoride delivered from Company A in China was purchased as a raw material, continuously supplied to a first distillation column at 2.19 tons/hour, and fractional distillation was performed.

The temperature at the column bottom part was designed to be 32° C. and the temperature at the column top part was designed to be 30° C., and distillation was performed continuously under the conditions of a pressure at the column top part of 0.5 bar and a reflux ratio of 1:3. At this time, a mixed gas containing an $F_2$ gas and an $N_2$ gas at 90:10% was continuously supplied from a first distillation column to the bottom of the distillation column at 1 kg/hour to perform an oxidation reaction, and low-boiling point and high-boiling point impurities were continuously extracted at 0.066 ton/hour.

Hydrogen fluoride, which was subjected to the oxidation reaction, purified, and cooled at the column top part, was transferred to a second distillation column through a transfer line at a rate of 2.124 tons/hour.

At this time, the operation of the second distillation column was performed under the same conditions as those of the first distillation column, and the low-boiling and high-boiling point impurities were continuously extracted at 0.044 tons/hour.

Hydrogen fluoride that passed through the second distillation column was supplied to a third distillation column at a rate of 2.08 tons/hour to perform fractional distillation. At this time, the operation of the distillation column was performed under the same conditions as those of the first distillation column, and the low-boiling and high-boiling point impurities were continuously extracted at 0.043 tons/hour.

Hydrogen fluoride that passed through the third distillation column was continuously stored in a storage tank at a rate of 2.037 tons/hour through a transfer line.

A long-term continuous operation was performed under these conditions, and the production volumes of ultra-high purity hydrogen fluoride per hour after 500 hours, 2,000 hours, 4,000 hours, 5,000 hours, and 6,000 hours were 2.037 tons, 2.037 tons, 2.037 tons, and 2.037 tons, which were very stable.

Example 2

The same process as in Example 1 was performed except that crude hydrogen fluoride was passed through an evaporator before being put into the first distillation column so that it was put into the first distillation column in a gaseous state.

Example 3

The same process as in Example 1 was performed except that a mixed gas containing the $F_2$ gas and the $N_2$ gas at 4:6% and 2:8% were supplied to the second and third distillation columns at 1 kg/hour, respectively.

Comparative Example 1

Hydrogen fluoride was purified in the same manner as in Example 1 without injection of the $F_2$ gas and the $N_2$ gas.

Comparative Example 2

Hydrogen fluoride was purified by performing the same process as in Example 3 except that the $F_2$ gas and the $N_2$ gas were injected only into the second and third distillation columns excluding the first distillation column.

Test Example 1

The contents of impurities in hydrogen fluoride purified in Examples and Comparative Examples were measured, and the results are shown in Table 1 below. At this time, the impurities were diluted in ultrapure water after pretreatment and measured in a state of 49% hydrofluoric acid using ion chromatography mass spectrometry and inductively coupled plasma mass spectrometry.

As content is very high so that it is desirable to proceed with the processes of Examples 1 to 3 to remove As.

In particular, in the case of Examples 1 to 3, it could be seen that as the $F_2$ gas/inert gas was put in the first multi-stage distillation column, the As content decreased to a large value compared to Comparative Examples 1 and 2. In addition, as in Example 3, the most excellent test results were shown when the gas stream was put into the second and third distillation columns.

EXPLANATION OF REFERENCE NUMERALS

100: Raw material supply unit
200: Distillation purification unit
300: Gas supply unit
400: Recovery unit
500: Advanced process control unit
600: Evaporator
110: Crude hydrogen fluoride storage tank
122: Raw material transfer line
210: First distillation column
220: Second distillation column
230: Third distillation column
218, 219, 228, 229, 238, 239: Discharge line
301: $F_2$ gas storage tank
302: Inert gas storage tank
310: First gas stream mixing device
320: Second gas stream mixing device
330: Third gas stream mixing device
410: Ultra-high purity hydrogen fluoride storage tank
422: Storage line
C1, C2, C3: Cooler
R1, R2, R3: Reflux drum

TABLE 1

| Concentration (ppt) | Impurities | Example 1 | Example 2 | Example 3 | Comparative Example 1 | Comparative Example 2 |
|---|---|---|---|---|---|---|
| After first distillation column purification | As | 2.42 | 3.71 | 2.77 | 300489534 | 280001289 |
| | B | 13.72 | 16.28 | 14.22 | 145557210 | 128633001 |
| | Ti | 16.18 | 14.31 | 11.84 | 651374 | 598251 |
| | Ca | 18.92 | 18.14 | 19.45 | 2210 | 2001 |
| | Fe | 13.48 | 12.88 | 10.95 | 1732 | 1914 |
| After second distillation column purification | As | 0.94 | 1.25 | 0.45 | 185533120 | 6452190 |
| | B | 7.54 | 9.82 | 4.42 | 21682 | 608 |
| | Ti | 8.69 | 8.44 | 2.22 | 45.22 | 14.62 |
| | Ca | 5.37 | 7.28 | 3.63 | 32.81 | 28.47 |
| | Fe | 6.95 | 7.31 | 3.98 | 27.05 | 17.39 |
| After final third distillation column purification | As | 0.31 | 0.68 | <0.10 | 48289002 | 2048 |
| | B | 0.46 | 0.67 | <0.10 | 3,081 | 102 |
| | Ti | 0.18 | 0.22 | <0.10 | 7.41 | 2.87 |
| | Ca | 0.28 | 0.42 | <0.10 | 20.37 | 7.92 |
| | Fe | 0.35 | 0.71 | <0.10 | 14.91 | 4.77 |

Referring to the table above, it can be seen that when a gas stream of the $F_2$ gas and the inert gas is injected and treated in a multi-stage distillation column into which crude hydrogen fluoride is put according to the present invention, it is contained at a level of ppt or less, that is, a ppq level, in final hydrogen fluoride.

In addition, looking at the results after purification in the third distillation column in the case of Comparative Examples 1 and 2, the contents of B, Ti, Ca, and Fe were able to be lowered to some extent, but it can be seen that the

L1, L2, L3: Inert gas supply line
M1, M2, M3: $F_2$ gas supply line

INDUSTRIAL APPLICABILITY

It is ultra-high purity hydrogen fluoride whose content of impurities (especially arsenic fluoride) in hydrogen fluoride recovered according to the present invention has a ppq level, and can be desirably applied to fields that require high purity hydrogen fluoride and hydrofluoric acid, such as etching and cleaning uses of semiconductors and displays.

The invention claimed is:

1. A method for purifying ultra-high purity hydrogen fluoride, the method including steps of:

providing crude hydrogen fluoride produced by a reaction between fluorspar and sulfuric acid and not having undergoine a pretreatment process from a raw material supply unit;

performing a continuous distillation process of supplying crude hydrogen fluoride to a multi-stage distillation column to extract and remove impurities in the distillation column after fractional distillation, and transfer distilled hydrogen fluoride to a next multi-stage distillation column; and injecting a gas stream containing an $F_2$ gas and an inert gas for removal of $AsF_3$ in impurities into the multi-stage distillation column into which crude hydrogen fluoride is put, wherein the gas stream is a gas stream whose concentration is adjusted according to the content of $AsF_3$ contained in hydrogen fluoride gas that passed through the multi-stage distillation column, and wherein the gas stream containing the $F_2$ gas and the inert gas is also injected into another multi-stage distillation column into which crude hydrogen fluoride is not put.

2. The method of claim 1, wherein crude hydrogen fluoride is put in a liquid or gaseous state.

3. The method of claim 1, wherein the gas stream contains the $F_2$ gas and the inert gas at 10:90 to 90:10% by weight.

4. The method of claim 1, wherein the inert gas is one or more selected from the group consisting of He, $N_2$, and Ar.

5. The method of claim 1, wherein $AsF_3$ in ultra-high purity hydrogen fluoride is present at ppt or less.

6. The method of claim 1, wherein the gas stream is also additionally put into the remaining multi-stage distillation columns.

7. An apparatus for purifying ultra-high purity hydrogen fluoride, the apparatus including:

a raw material supply unit for supplying a crude hydrogen fluoride produced by a reaction between fluorspar and sulfuric acid and not having undergone a pretreatment process;

a distillation purification unit equipped with a plurality of multi-stage distillation columns for performing a continuous distillation process;

a gas supply unit for supplying a gas stream containing an $F_2$ gas and an inert gas into the multi-stage distillation columns;

a recovery unit for recovering ultra-high purity hydrogen fluoride;

an advanced process control unit for process control to enable continuous process, wherein a gas stream whose concentration is adjusted according to the content of $AsF_3$ contained in hydrogen fluoride gas that has passed through the multi-stage distillation columns by the advanced process control unit is supplied to the multi-stage distillation columns into which crude hydrogen fluoride is put, and wherein the gas stream containing the $F_2$ gas and the inert gas is also injected into another multi-stage distillation column into which crude hydrogen fluoride is not put.

* * * * *